United States Patent
Matsuzaki et al.

(10) Patent No.: US 6,907,069 B2
(45) Date of Patent: Jun. 14, 2005

(54) PICTURE CODING APPARATUS, PICTURE CODING METHOD, AND RECORDING MEDIUM HAVING PICTURE CODING PROGRAM RECORDED THEREON

(75) Inventors: Kazuhiro Matsuzaki, Tokyo (JP); Yoshiaki Kato, Tokyo (JP); Tokumichi Murakami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 655 days.

(21) Appl. No.: 09/739,121

(22) Filed: Dec. 19, 2000

(65) Prior Publication Data

US 2001/0055337 A1 Dec. 27, 2001

(30) Foreign Application Priority Data

Jun. 21, 2000 (JP) ...................................... P.2000-186269

(51) Int. Cl.⁷ ................................................. H04N 7/12
(52) U.S. Cl. ............................ 375/240.12; 375/240.15; 348/394.1
(58) Field of Search .............................. 348/394.1, 700; 382/238, 239; 375/240.03–240.07, 240.12–240.13, 240.15, 240.25–240.27

(56) References Cited

U.S. PATENT DOCUMENTS

| 5,686,963 | A | * | 11/1997 | Uz et al. | ................ | 375/240.06 |
| 6,256,451 | B1 | * | 7/2001 | Mitsui | ........................ | 386/52 |
| 6,343,153 | B1 | * | 1/2002 | Kawasaki et al. | .......... | 382/239 |
| 6,480,540 | B1 | * | 11/2002 | Guillotel | ................ | 375/240.03 |
| 2003/0067989 | A1 | * | 4/2003 | Yoshinri | ................ | 375/240.25 |

FOREIGN PATENT DOCUMENTS

| JP | 993537 | 4/1997 |
| JP | 9322176 | 12/1997 |
| JP | 10313463 | 11/1998 |

* cited by examiner

Primary Examiner—Jeffery Hofsass
Assistant Examiner—George Bugg
(74) Attorney, Agent, or Firm—Birch, Stewart, Kolasch & Birch, LLP

(57) ABSTRACT

A plurality of picture frames is arranged as one group according to correlation between picture frames in a picture sequence. Then, a coding mode corresponding to each of the picture frames of the group is determined. Subsequently, preceding is performed according to the coding mode. Then, the coding of a picture is performed by controlling a coding parameter according to a result of the preceding and to the coding mode.

4 Claims, 7 Drawing Sheets

|  | PICTURE FRAME NUMBER | | | | | | | | | | |
|---|---|---|---|---|---|---|---|---|---|---|---|
|  | 1 | 2 | 3 | ... | i-2 | i-1 | i | i+1 | i+2 | ... | N |
| FORWARD PREDICTION ERROR EVALUATION VALUE (Ef) | – | 7 | 4 | – | 11 | 7 | 9 | 24 | 5 | – | 4 |
| BACKWARD PREDICTION ERROR EVALUATION VALUE (Eb) | 3 | 5 | 3 | – | 9 | 8 | 28 | 6 | 5 | – | – |

SCENE CHANGED PORTION

| FRAME NUMBER | 1 | 2 | 3 | 4 | 5 | 6 | 7 | ... | N |
|---|---|---|---|---|---|---|---|---|---|
| CODING MODE | I | B | B | P | B | B | P | ... | B |
| INITIAL VALUE OF TARGET CODE AMOUNT [ MBIT/FRAME ] | 1.8 | 0.5 | 0.5 | 0.9 | 0.5 | 0.5 | 0.9 | | 0.5 |
| AMOUNT OF CODES GENERATED DURING PRECODING [ MBIT/FRAME ] | 1.9 | 0.5 | 0.3 | 0.7 | 0.4 | 0.6 | 1.4 | ... | 0.3 |
| ACTIVITY (HIGH: 1, 2, ..., 5: LOW) | 3 | 3 | 2 | 2 | 3 | 4 | 5 | ... | 2 |

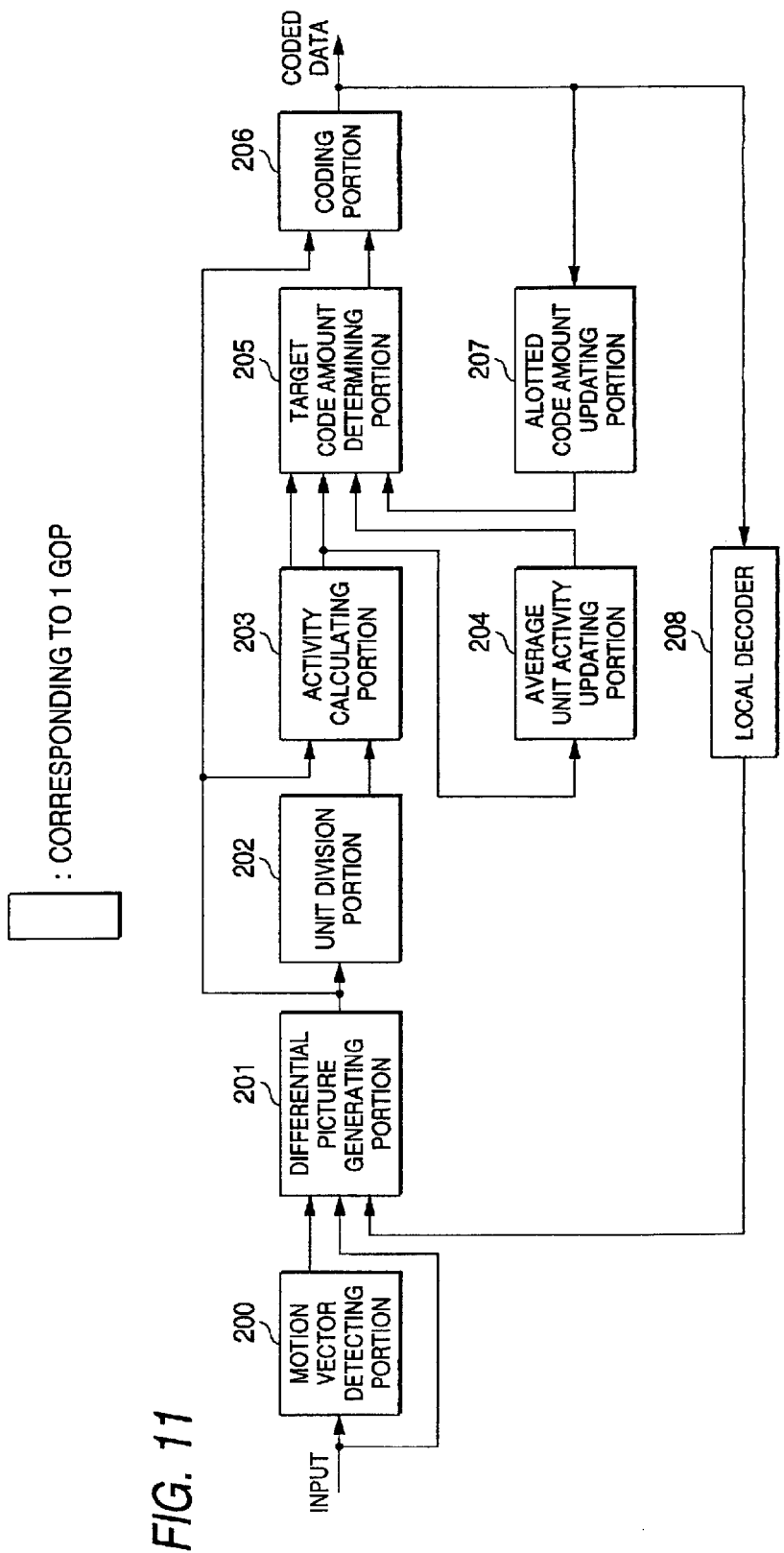

PICTURE CODING APPARATUS, PICTURE CODING METHOD, AND RECORDING MEDIUM HAVING PICTURE CODING PROGRAM RECORDED THEREON

BACKGROUND OF THE INVENTION

1. Field of the Invention

This invention relates to the improvement of efficiency of picture coding of images formed by MPEG-2 video signals, and to digital broadcast service, Internet video distribution, and package media production.

2. Description of the Related Art

FIG. 9 is a process block diagram illustrating a conventional picture coding apparatus disclosed in, for example, JP-A-9-93537 official gazette.

In FIG. 9, reference numeral 81 designates a picture frame reordering process, 82 denotes a differencing process, 83 designates a discrete cosine transform (DCT) process, 84 denotes a quantization process, 85 designates an inverse quantization process, 86 denotes an inverse DCT (IDCT), 87 designates an addition process, 88 denotes a motion compensation process, 89 designates a variable length coding process, 90 denotes a buffering process, and 91 designates a coding control process.

Next, processing to be performed at the transmitting side of a conventional picture coding apparatus is described hereinbelow with reference to FIG. 9.

Picture frames each serving as the unit of coding in a picture signal 101 are reordered in coded order by performing the picture frame reordering process 81. Then, the reordered picture frames are outputted. In the motion compensation process 88, the motion compensation prediction of a coding object picture frame 103 is performed by using one or more coding picture frames. Thus, a motion vector 104 and a motion compensation predicted picture frame 105 are generated. In the differencing process 82, a prediction error picture frame 106 is generated by calculating the difference between the coding object picture frame 103 and the motion compensation predicted picture frame 105. In the DCT process 83, a DCT is performed on the prediction error picture frame 106, so that a set of transform coefficients is generated. In the quantization process 84, quantization is performed on the set of transform coefficients, so that a set of quantization indexes is generated. In the inverse quantization process 85, a set of transform coefficients is decoded from the set of quantization indexes. In the IDCT process 86, a prediction error picture frame 107 is decoded from the set of transform coefficients. In the addition process 87, a coded picture frame 108 is generated by adding the prediction error picture frame 107 to the motion compensation predicted picture frame 105. In the variable length coding process 89, the quantization indexes and the motion vector 104 are variable length coded, so that a coded bit string is generated. In the buffering process 90, the coded bit string is once stored. Then, a coded bit string 102 is outputted at a fixed bit rate. In the coding control process 91, the feedback control of the DCT process, the quantization process, and the variable length coding process is performed by monitoring the buffering state. Incidentally, in the case of the MPEG-2 video coding method, a series of pixel blocks (or macroblocks) in a picture frame is referred to as a "slice". The control of the quantization is usually performed in slice units.

Next, interframe prediction comprising the motion compensation process 88 and the differencing process 82 is described hereunder. Picture frames in the picture coding according to MPEG-2 standard are classified into three types, namely, I-pictures, P-pictures, and B-pictures by the manner of performing the interframe prediction. The I-pictures are picture frames, each of which is coded therein without performing interframe prediction. The P-pictures are picture frames, each of which is interframe prediction coded by using a coded picture of a past picture frame. The B-pictures are picture frames, each of which is interframe prediction coded by using both of past and future picture frames. Therefore, in the case of coding I-pictures, the motion compensation process 88 and the differencing process 82 are omitted. Consequently, a coding object picture frame directly undergoes the DCT process 83.

Next, the picture frame reordering process 81 is described hereinbelow. FIG. 10 is a diagram illustrating the reordering of picture frames. This figure illustrates the comparison between the picture frame sequence in displaying order and the picture frame sequence in coded order. Moreover, this figure illustrates a coding mode corresponding to each of the picture frames (that is, corresponding to each of the three picture types, namely, the I-picture, P-pictures, and B-pictures). A sequence of picture frames arranged in displaying order is reordered by the picture frame reordering process 81 into a sequence of picture frames arranged in coded order. In the case of the picture coding according to MPEG-2 standard, a group-of-pictures (GOP) header can be inserted just before a coded bit string corresponding to an I-picture. In the coded bit string, one GOP consists of pictures included within a range from an I-picture placed just after the GOP header to a picture placed immediately before the next GOP header. That is, one GOP includes one or more I-pictures without exception. In the case of an example shown in FIG. 10, one GOP consists of 15 picture frames whose picture frame numbers range from (−1) to 13. Let M (frames) and N (frames) denote the frame interval between a P-picture and an I-picture or another P-picture, and the number of picture frames composing one GOP, respectively. In the case of FIG. 10, M=3, and N=15. Usually, the values of such M and N are fixed. In the aforementioned manner, the coding is performed by reordering the sequence of picture frames in coded order and by then carrying out the interframe prediction.

Further, FIG. 11 is a process block diagram illustrating a conventional picture coding apparatus disclosed in, for example, JP-A-10-313463 official gazette.

In FIG. 11, reference numeral 200 designates a motion vector detecting portion, 201 denotes a differential picture generating portion, 202 designates a unit division portion, 203 denotes an activity calculating portion, 204 denotes an average unit activity updating portion, 205 designates a target code amount determining portion, 206 denotes a coding portion, 207 designates an allotted code amount updating portion, and 208 denotes a local decoder.

Next, processing to be performed at the transmitting side of this picture coding apparatus is described hereinbelow with reference to FIG. 11.

As shown in FIG. 11, an input picture signal is inputted to both the motion vector detecting portion 200 and the differential picture generating portion 201. The motion vector detecting portion 200 outputs a motion vector according to the picture type of the input picture. That is, in the case that the input picture is a P-picture or B-picture, this portion performs motion vector detection and then outputs a motion vector. In the case that the input picture is an I-picture, this portion does not perform motion vector detection.

In the case that the input picture is a P-picture or B-picture, the differential picture generating portion 201 generates a prediction picture from both the inputted motion vector and a decoded reference picture, which is inputted from the local decoder 208. Subsequently, the portion 201 performs a differencing operation on the prediction picture and the input picture. Then, the portion 201 outputs a differential picture. This differential picture is inputted to the unit division portion 202, the activity calculating portion 203, and the coding portion 206. Incidentally, in the case that the input picture is an I-picture, the input picture itself is outputted from the differential picture generating portion 201, and inputted to the unit division portion 202, the activity calculating portion 203, and the coding portion 206.

The unit division portion 202 defines an I-unit, which consists of one I-picture and two B-pictures, and a P-unit that consists of one P-picture and two B-pictures. Further, this portion 202 determines according to the picture type of the inputted differential picture which of the I-unit and the P-unit the inputted differential picture belongs to. Further, the portion 202 divides the inputted differential images into the units. Then, the portion 202 outputs unit information on each of the units.

The activity calculating portion 203 performs an activity operation on the inputted differential picture, and then outputs a frame activity. The activity is a measure of complexity of a picture and easiness of coding.

This activity is inputted to the target code amount determining portion 205. Moreover, the activity calculating portion 203 outputs a unit activity of the unit, to which the differential picture belongs, from the unit information thereon. This unit activity is inputted to the average unit activity updating portion 204 and the target code amount determining portion 205.

The average unit activity updating portion 204 updates the average unit activity of the unit from the inputted unit activity.

The target code amount determining portion 205 outputs a target code amount corresponding to a coded frame according to the inputted frame activity, the unit activity, the average unit activity, and the allotted code amount.

The coding portion 206 performs coding on the inputted differential picture, based on the inputted target code amount. Then, the portion 206 outputs coded data. Subsequently, the coded data is inputted to the allotted code amount updating portion 207 and the local decoder 208.

The allotted code amount updating portion 207 calculates a generated code amount from the inputted coded data, and updates the allotted code amount.

The local decoder 208 performs decoding on the inputted coded data, and generates a decoded picture.

In this way, the conventional apparatus determines the degree of complexity of a to-be-coded picture frame in terms of the activity according to a result of preceding. Then, the conventional apparatus sets a target code amount corresponding to the unit of coding control so that the total amount of generated codes is within a desired code amount. Thus, the conventional apparatus controls quantization characteristics in coding.

The conventional picture coding apparatus shown in FIG. 9 performs the aforementioned operation, and also performs the feedback control of coding characteristics by monitoring the amount of codes for a picture frame and a slice, and the buffering state so that a coding bit rate is constant. Thus, in the case of instantaneously varying scenes and rapidly moving pictures, the time correlation therebetween (namely, between picture frames) and the spatial correlation therebetween (namely, in a picture frame, for example, between slices) are low. Thus, usually, an amount of actually generated codes largely exceeds an amount of codes, which is estimated before the coding. That is, in the case of coding instantaneously varying scenes and rapidly moving pictures, the feedback control often cannot follow the actual variation in the generated code amount and thus fails, with the result that the picture quality of coded pictures is deteriorated.

Further, in the case of the conventional picture coding apparatus illustrated in FIG. 11, the degree of complexity of picture frames to be coded is determined according to a result of preceding. Further, the target code amount corresponding to the unit of coding control is set so that the total amount of generated codes is within a desired code amount. Thus, the quantization characteristics in coding are controlled. Such a coding method is suitable for coding signals to be stored on storage media, such as a DVD. However, such a conventional control method is used for controlling mainly the quantization characteristics, so that change of coded picture quality is often visible on the change point of quantization characteristics.

Furthermore, the conventional picture coding apparatus does not control the coding mode (or picture type) and the size of GOP according to the characteristics of a picture to be coded, which are estimated from different aspects, for instance, the long-term variation in complexity of the picture, and the presence or absence of a scene change. It is, thus, difficult to achieve highly efficient coding by suppressing the variation in the coding quality within a restricted range of amounts of codes.

Additionally, a feedforward control method of performing the quantization by using all of available quantization characteristics and selecting the quantization characteristic corresponding to an amount of obtained codes, which is closest to a target code amount, is sometimes employed for controlling the quantization characteristics. However, in this case, the conventional apparatus has drawbacks in a very large amount of operation and a very large circuit size.

SUMMARY OF THE INVENTION

The present invention is accomplished to eliminate the aforementioned drawbacks of the conventional picture coding apparatuses.

Accordingly, an object of the present invention is to realize high quality coding without failure of control of coding operations even in the case of coding instantaneously varying scenes and rapidly moving pictures.

Further, another object of the present invention is to realize highly efficient coding, by which the characteristics of a to-be-coded picture can be evaluated from different aspects according to long-term variation of complexity of the picture and the presence or absence of a scene change and by which variation in the coding quality can be suppressed within a restricted range of amounts of codes.

According to an aspect of the present invention, there is provided a picture coding apparatus that comprises group structure determining means for setting a plurality of picture frames as one group according to correlation between picture frames in a picture sequence and for determining a coding mode corresponding to each of the picture frames of this group, precoding means for performing precoding according to the coding mode determined by this group structure determining means correspondingly to each of the picture frames, and coding means for performing coding of a picture by controlling a coding parameter according to a result of precoding, which is obtained by this preceding means, and to the coding mode determined by the group structure determining means.

Further, the picture coding apparatus may further comprise scene change detecting means for evaluating correlation between the picture frames in the picture sequence and for detecting, when there is a part having low interframe correlation, the part as a scene change part. The group structure determining means may be adapted to set the plurality of picture frames as one group according to this detected scene change part.

Further, the scene change detecting means may be adapted to perform a forward motion compensation interframe prediction and a backward motion compensation interframe prediction on each frame of an input picture sequence of a plurality of frames and to detect a scene change by evaluating results of both the forward and backward predictions.

Furthermore, the scene change detecting means may be adapted to detect scene change by calculating a prediction error evaluation value correspondingly to each of the regions of the frames and to evaluate the calculated prediction error evaluation value correspondingly to each of the frames.

Furthermore, the group structure determining means may set a default value of the number of frames when the group is constituted. Moreover, when there is a part having low interframe correlation, the group structure determining means may set the number of frames of the group so that the boundary of the group is located in the part having low interframe correlation. Further, when the number of consecutive picture frames each having high interframe correlation exceeds the default value, the group structure determining means may set the number of frames of the group at a value that is larger than the default value.

Further, the group structure determining means may be adapted so that when determining the coding mode of each of the picture frames of the group, the group structure determining means sets a frame interval between a unidirectional prediction coded frame and an interframe coded frame and a default value of the frame interval therebetween and allots a unidirectional motion compensation interframe prediction coding mode to a corresponding picture frame, and also allots a unidirectional interframe prediction coding mode preferentially to a picture frame whose unidirectional motion compensation interframe prediction error evaluation value is less than a predetermined value.

Furthermore, the preceding means may be adapted to output activity corresponding to each of the picture frames as a part of the result of preceding. Moreover, the coding means may be adapted to perform coding of a picture by controlling the coding parameter according to this activity corresponding to each of the picture frames.

Further, the picture coding apparatus may further comprise code amount allotting means for allotting a target code amount to each of the picture frames according to the result of precoding performed by the preceding means and to the coding mode determined by the group structure determining means correspondingly to each of the picture frames of the group. Moreover, the coding means may perform the coding of each of the picture frames by controlling the coding parameter according to the target code amount allotted by this code amount allotting means to each of the picture frames.

Furthermore, the code amount allotting means may comprise first code amount allotting means for allotting a target code amount according o the result of preceding performed by the preceding means and to the coding mode determined by the group structure determining means correspondingly to each of the picture frames of the group, and second code amount allotting means for allotting the target code amount, which is allotted by the first code amount allotting means correspondingly to each of the picture frames, according to a code amount of each of regions, which are used in the preceding performed by the preceding means, of the picture frames as a target code amount corresponding to each of regions of the picture frames. Moreover, the coding means my perform the coding by controlling the coding parameter according to the target code amount corresponding to each of the picture frames and to the target code amount corresponding to each of the regions of the picture frames.

Further, the code amount allotting means may be adapted to allot an initial value to the target code amount corresponding to each of the picture frames, and to determine activity corresponding to each of the picture frames by comparing the allotted initial value of the target code amount with an amount of codes, which are obtained by the preceding and generated correspondingly to each of the picture frames, and to set a target code amount corresponding to each of the picture frames according to this activity.

Furthermore, according to another aspect of the present invention, there is provided a picture coding method, which comprises the steps of constituting a plurality of picture frames as one group according to correlation between picture frames in a picture sequence, determining a coding mode corresponding to each of the picture frames of this group, performing preceding according to this coding mode determined correspondingly to each of the picture frames, and performing coding of a picture by controlling a coding parameter according to a result of this preceding and to the determined coding.

Further, the picture coding method may further comprise the steps of allotting a target code amount to each of the picture frames according to the result of preceding and to the coding mode determined correspondingly to each of the picture frames of the group, and performing coding of each of the picture frames by controlling the coding parameter according to this target code amount allotted to each of the picture frames.

Furthermore, the picture coding method may further comprises the steps of allotting a target code amount according to the result of preceding and to the coding mode determined correspondingly to each of the picture frames of the group, and allotting the target code amount corresponding to each of the picture frames according to a code amount of each of regions, which are used in the preceding, of the picture frames as a target code amount corresponding to each of regions of the picture frames, and performing coding by controlling the coding parameter according to the target code amount corresponding to each of the picture frames and to the target code amount corresponding to each of the regions of the picture frames.

BRIEF DESCRIPTION OF THE DRAWINGS

FIG. 10 is a diagram illustrating an operation of reordering picture frames.

FIG. 11 is a block diagram illustrating the configuration of a conventional picture coding apparatus.

DETAILED DESCRIPTION OF THE PRESENT INVENTION

Hereinafter, embodiments of picture coding apparatus according to the present invention will be described hereinbelow.

First Embodiment

Figures 1, 2:
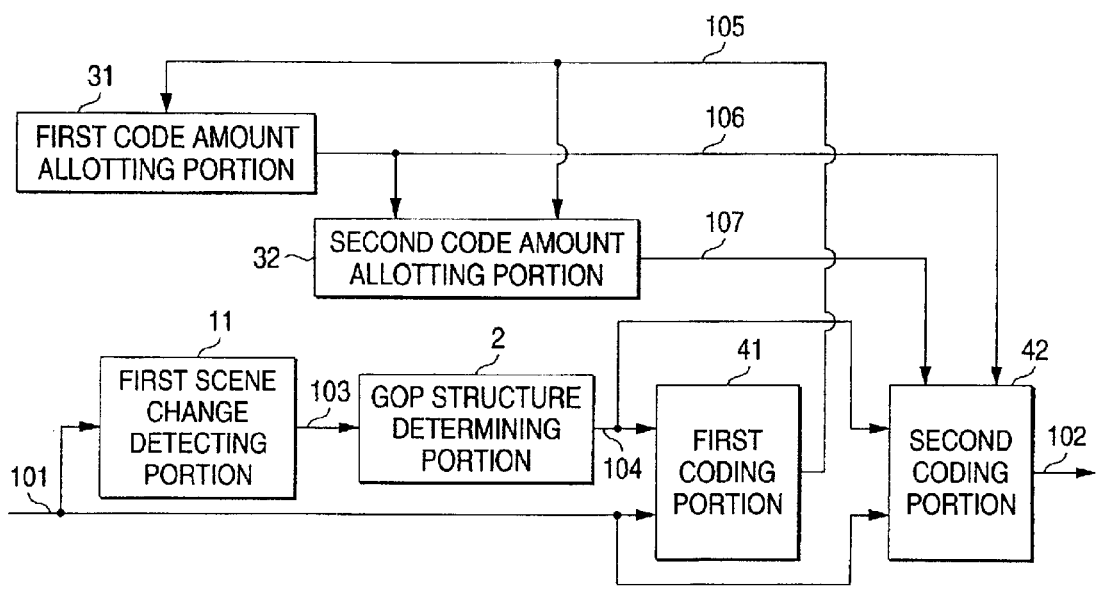
FIG. 1 is a block diagram illustrating a picture coding apparatus that is an embodiment of the present invention.
FIG. 2 is a diagram illustrating a scene change detecting process in the embodiment of the present invention.

FIG. 1 is a block diagram illustrating a picture coding apparatus that is an embodiment of the present invention. In FIG. 1, reference numeral 11 designates a first scene change detecting portion serving as the scene change detecting means, 2 denotes a GOP structure detecting portion acting as the group structure determining means, 31 and 32 designate first and second code amount allotting portions serving as the code amount allotting means, 41 denotes a first coding portion serving as the preceding means, and 42 designates a second coding portion serving as the coding means.

In this embodiment, the correlation between picture frames corresponding to an input picture is evaluated. Then, a picture boundary having low interframe correlation is detected as a transition between scenes, namely, a scene change position. The constitution of a GOP is determined according to a result of this detection of a scene change and to the correlation between the picture frames. Moreover, the coding mode of each of the picture frames of the GOP is determined. Then, preceding is performed according to the determined constitution of the GOP and to the determined coding modes. Subsequently, a code amount to be allotted to each of the picture frames is determined according to a result of the preceding and to a set total code amount or an average code amount per unit time. Moreover, a code amount to be allotted to each of regions of the picture frames is determined.

Thus, the suitable code amounts are finally allotted by determining the GOP constitution, which is adapted to characteristics of the picture, and the coding mode corresponding to each of the frames and then performing the preceding thereof. Therefore, as compared with the case of performing coding by controlling only the target code amount and the quantization characteristics, a suitable GOP structure can be obtained. Moreover, a suitable code amount can be allotted thereto. Consequently, the long-term variation in complexity of a picture and the variation in coding quality corresponding to each of picture frames, which depends upon the presence or absence of a scene change, can be more effectively suppressed. Moreover, highly efficient coding is achieved with high quality within a restricted code amount.

First, the first scene change detecting portion 11 evaluates the correlation between the picture frames of an input picture sequence and thus detects a transition between scenes, namely, a scene change position.

The first scene change detecting portion 11 performs a forward motion compensation interframe prediction on each of the frames of the input picture sequence 101 of N frames. That is, the portion 11 performs a motion compensation interframe prediction on a current frame by using the just precedent input picture frame. Thus, the portion 11 calculates a forward prediction error evaluation value (Ef) corresponding to each of the frames.

Furthermore, the first scene change detecting portion 11 performs a backward motion compensation interframe prediction on the input picture sequence of N frames. That is, the portion 11 performs a motion compensation interframe prediction on the current frame by using the immediately subsequent picture frame. Thus, the portion 11 calculates a backward prediction error evaluation value (Eb) corresponding to each of the frames.

These values Ef and Eb are given by, for instance, a sun of absolute values, averages of the sum of absolute values, square sum values, or averages of the square sum values of the forward and backward motion compensation interframe prediction errors.

Subsequently, the averages (Av.Ef, Av.Eb) of such values Ef and Eb of N frames are calculated. Then, values Efn and Ebn−1, which meet the following inequalities (1) and (2), are detected.

$$Efn > Av.Ef + Te \quad (1)$$

(n=1, 2, . . . , N; Te is the threshold value)

$$Ebn-1 > Av.Eb + Te \quad (2)$$

(n=1, 2, . . . , N; Te is the threshold value)

FIG. 2 shows examples of calculation of the values Ef and Eb.

In the case that there is a value Efn, which meets the inequality (1), among N frames, a position between an nth frame and the just precedent frame is a candidate for a scene change position to be determined according to the forward motion interframe prediction. Further, in the case that there is a value Ebn−1, which meets the inequality (2), among N frames, a position between an nth frame and the immediately subsequent frame is a candidate for a scene change position to be determined according to the backward motion interframe prediction.

For example, regarding the value Ef, when the values Efi−k and Efi+1 meet the inequality (1), a position between the (i−k−1)th frame and the (i−k)th frame and a position between the ith frame and the (i+1)th frame are candidates for the scene change position. Further, regarding the value Eb, when the value Ebi meets the inequality (2), a position between the ith frame and the (i+1)th frame is a candidate for the scene change position.

Moreover, a position meeting both the inequalities (1) and (2) is determined as the scene change position.

In the case of the example of FIG. 2, regarding the value Ef, the position between the ith frame and the (i+1)th frame is a candidate for the scene change position (incidentally, the value Efi+1 is large). Regarding the value Eb, the position between the ith frame and the (i+1)th frame is a candidate for the scene change position (incidentally, the value Ebi is large). As a result, the position between the ith frame and the (i+1)th frame, which meets both the inequalities (1) and (2), is decided as the scene change position.

Incidentally, in this stage, in the case that only one of the inequalities (1) and (2) holds, the prediction of the input picture frame is not successfully performed. Furthermore, it is not judged that there is a scene change position.

Incidentally, the threshold values Te used in the inequalities (1) and (2) are preset default values. For instance, the time-dependent variation of a picture sequence to be coded is relatively large, or in the case that the scenes are relatively complex, the default values of the threshold values Te are set at relatively large values.

The values Ef and Eb depend upon the properties of the picture. Thus, the accuracy of the scene change detection is enhanced by adjusting the threshold values Te according to the distribution of the values Ef and Eb of each picture frame. For instance, the average of each of the values Ef and Eb is calculated correspondingly to each picture frame. Then, the threshold value Te is set at a value obtained by multiplying the calculated average by $\alpha$.

Further, the scene change position may be detected by calculating the degrees $|Efn-Efn-1|$ and $|Ebn-Ebn-1|$ of the values Ef and Eb instead of the values Ef and Eb, and then performing threshold value decision operations.

Moreover, although it has been described in the foregoing description that a position meeting both the predetermined conditions corresponding to the values Ef and Eb is determined as the scene change position, the scene change position may be detected by using only one of the values Ef and Eb or only one of the degrees $|Efn-Efn-1|$ and $|Ebn-Ebn-1|$.

Furthermore, in the case that two or more scene change positions are successively detected in N frames, one of the detected scene change positions, which has the largest prediction pixel evaluation value, may be determined as a scene change position.

Further, although it has been described in the foregoing description that the detection of the scene change is performed according to the prediction error evaluation value corresponding to each of the picture frames, the detection of the scene change may be performed by calculating the prediction error evaluation value correspondingly to each of objects or slices of the picture frames and then comprehensively deciding the presence or absence of a scene change from the obtained prediction error evaluation values.

In the aforementioned way, the scene change is detected. Subsequently, the GOP structure determining portion 2 determines the GOP structure (namely, the number of picture frames of one GOP and the decoding mode of each of the picture frames) according to the result of the scene change determination performed by the first scene change determining portion 11.

Hereinafter, a method of determining the GOP structure is described.

The method of determining the GOP structure has two steps, namely, the step of determining the number of the picture frames of a GOP and the step of determining the coding mode corresponding to each of the picture frames of the GOP. First, the process of determining the number of the picture frames of the GOP is described hereinbelow. A default value N (frames) of the number of the picture frames of the GOP is first set. Usually, 1 GOP is comprised of N frames. However, in the case that a scene change is present in N picture frames, the picture frames from the first picture frame to the picture frame just preceding the scene change are gathered in such a manner as to compose 1 GOP. Further, the remaining picture frames from the picture frame immediately subsequent to the scene change are gathered in such a way as to compose the next GOP. That is, the GOPs are constituted so that the picture frame just subsequent to each of the scene changes is the leading one of the picture frames of the GOP. Furthermore, in the case that there is almost no change between the adjacent picture frames over N frames, 1 GOP is composed of picture frames of the number that is larger than N.

Figure 3:
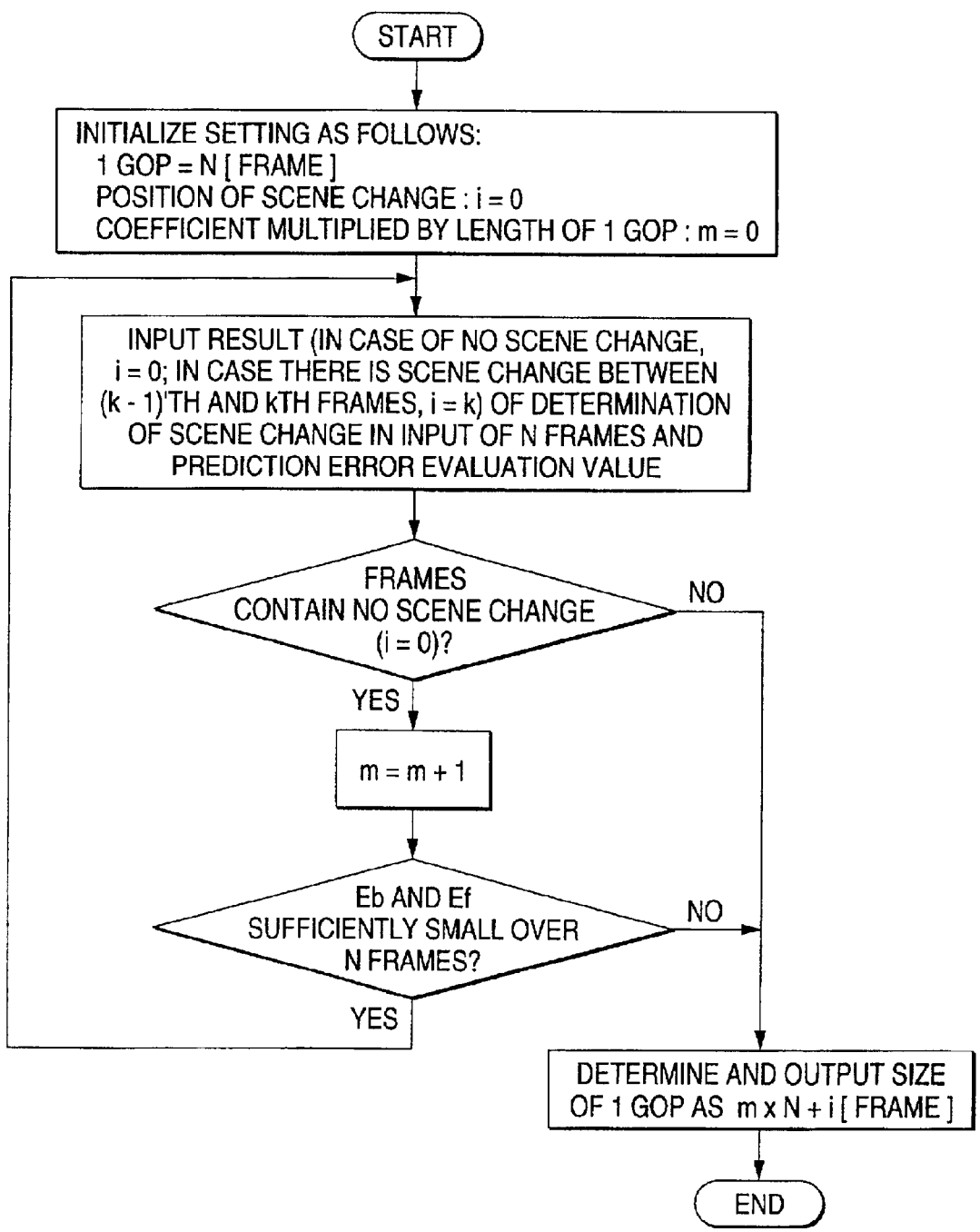
FIG. 3 is a flowchart illustrating an operation of determining the size of GOP in the embodiment of the present invention.

In this embodiment, the default value N is equal to the number N of frames of an input picture sequence, which are used for detecting a scene change in the first scene change detecting portion 11. In the case that no scene change is detected in the input picture sequence having N frames in the first scene change detecting portion 11, the default value N is the number of frames of 1 GOP. Incidentally, in the case that the forward prediction error evaluation value (Ef) and the backward prediction error evaluation value (Eb) illustrated in FIG. 2 are sufficiently small over N frames, it is judged that still picture frames are consecutively included therein. Thus, the number of frames of 1 GOP is set in such a manner as to be larger than the default value N (frames) so as to prevent the code amount from increasing when I-picture coding is performed. FIG. 3 shows a flowchart of the aforementioned process of determining the size of 1 GOP.

First, initialization is performed (step 301). In this figure, "i" denotes a result of the scene change determination. In the case that there is no scene change, i=0. Conversely, in the case that there is a scene change, "i" indicates the position at which the scene change is present. Subsequently, the result of the scene change determination performed on the predetermined N frames and the prediction error evaluation results Ef and Eb are inputted (step 302). Then, it is first judged (step 303) whether or not a scene change is present in the N frames. In the case that no scene change is present (yes), the value of a parameter "m" is increased by 1 (step 304). Incidentally, the parameter "m" indicates the number of occurrences of N frames in which no scene change is present. Thereafter, the prediction error evaluation results Ef and Eb are checked. It is thus judged (step 305) whether or not the values Ef and Eb are sufficiently small over the N frames. When these values are sufficiently small over the N frames (yes), this is the case that still picture frames are consecutively arranged. Thus, an increase in the code amount at the time of performing I-picture coding is prevented by setting the size of 1 GOP in such a manner as to be larger than the number N of the frames. Then, control returns to the determination on the next N frames (step 302).

When it is judged at step 303 that there is no scene change, or when it judged at step 305 that the values Ef and Eb are not sufficiently small over the N frames (that is, the correlation between the adjacent frames is not high, similarly as in the case of the presence of a scene change), the size of 1 GOP is determined at step 306. That is, a sum of the number (m×N) of frames of sets of N frames, in which no scene changes occur, and the position "i" of is determined as the size of 1 GOP.

In the aforementioned manner, the size of 1 GOP is determined. Subsequently, the coding mode of each of the picture frames of 1 GOP is determined.

The available coding modes are the following three modes, that is, an intra coding (I-picture) mode, a forward prediction coding (P-picture) mode for performing a forward motion compensation prediction, and a bi-directional prediction coding (B-picture) for performing both forward and backward motion compensation predictions. Further, the default value of the distance (M (frames)) between the P-picture and the I- or P-picture, and that of the number of picture frames of 1 GOP (N (frames); 1 GOP=N) are preset.

First, the leading picture frame of the GOP is in the I-picture mode at all times.

Subsequently, usually, sets of M frames, the number of which is determined as the default value, are assigned to the P-picture mode. However, in this case, the P-picture mode is allotted to picture frames each having a sufficiently small forward prediction error evaluation value (that is, such an evaluation value is less than the preset threshold value T1p), or pictures having a value, which is obtained by subtracting the backward prediction error evaluation value (Eb) from the forward prediction error evaluation value (Ef) and less than the preset threshold value (T2P). Moreover, the B-picture mode is allotted to the remaining picture frames. This is because of facts that the quantity of necessary motion vector information in the P-picture mode is low as compared in the case of the B-picture mode, and that when the prediction error in the P-picture mode is sufficiently small, the coding is more efficiently performed by selecting the P-picture mode as compared with the case of selecting the B-picture.

Figure 4:
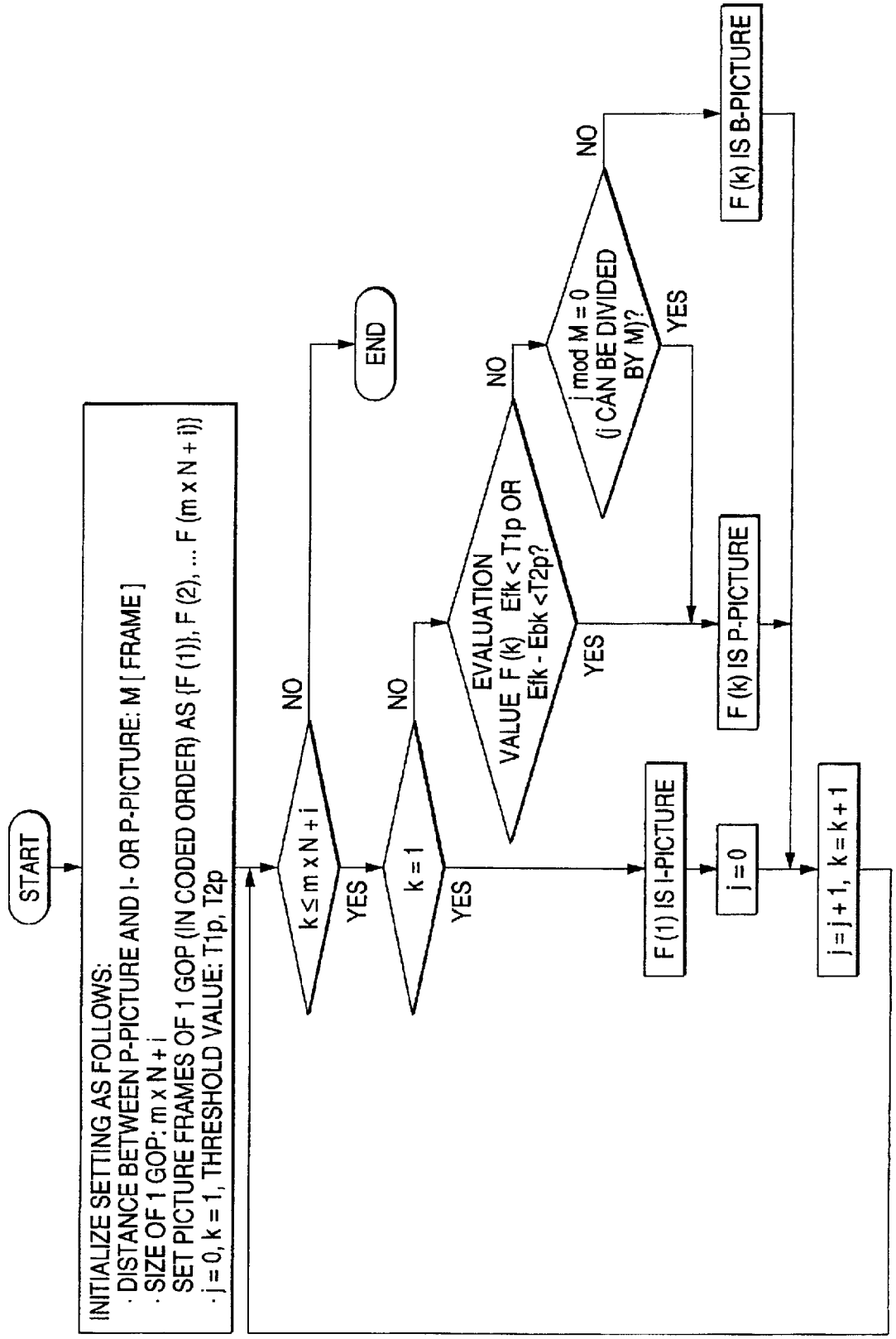
FIG. 4 is a flowchart illustrating an operation of determining a coding mode corresponding to each of picture frames of GOP in the embodiment of the present invention.

FIG. 4 is a flowchart illustrating an operation of determining the coding mode corresponding to each of the picture frames in such a GOP.

Incidentally, as described in the foregoing description of this embodiment, the discontinuity point of a scene is aligned with boundary of a GOP. Moreover, the I-picture coding is performed on the frame just subsequent to the scene change at all times. These facilitate access to the stored coded picture and high-speed search for the discontinuity point of a scene, and are convenient to edit a picture by cutting and pasting scenes.

As a practical example of an operation of determining the size of 1 GOP and determining the coding mode corresponding to each of the picture frames, the case of setting N=15 (frames) and M=3 (frames) as the default values is described hereinbelow. In the case that no scene changes are detected in the N frames, 1 GOP consists of 15 frames, the number of which is the default value. That is, in the case of the example illustrated in FIG. 10, the picture frames allotted in displaying order and having the frame Nos. ranging from (−1) to 13 constitute 1 GOP. Further, in the case that the value Ef of each of the picture frames is larger than the threshold value T, the coding mode allotted to each of the picture frames is as illustrated in FIG. 10.

Incidentally, in the case that the values Eb and Ef are sufficiently small over 15 frames, and that no scene changes occur in these 15 frames and the subsequent 15 frames, the number of frames of 1 GOP is doubled, namely, is 30 (frames) or more.

In the case that a scene change is detected between ith frame and (i+1)th frame in the input picture sequence consisting of N frames as illustrated in FIG. 2, the scene change position serves as the boundary of the GOP. In this case, the picture frames allotted in displaying order and having the frame Nos. ranging from (−1) to "i" constitute 1 GOP.

The coding mode of the picture frames, whose frame Nos. ranges from (−1) to "i", is the same as the coding mode allotted in the case that no scene changes are detected. The I-picture mode is allotted to the (i+1)th frame that is the leading picture frame of the next GOP. In the aforementioned way, the GOP structure is determined.

Next, a precoding operation is described hereinbelow. As described above, a preceding operation is performed on a GOP suitable grouped according to the interframe correlation, and the existence of a scene change. Thus, a coding control operation can be performed by determining a target code amount for coding according to a resultant code amount. Consequently, highly efficient coding is achieved with high quality corresponding to each of GOPs, into which picture frames are suitably grouped, within a restricted code amount.

Practically, as described above, the preceding is performed in the first coding portion 41 according to the GOP structure 104 determined by the GOP structure determining portion 2, as shown in FIG. 1.

Subsequently, the target code amount 106 used in coding correspondingly to each of the picture frames is determined by the first code amount allotting portion 31 by utilizing the code amount corresponding to each of the picture frames (or to each of the pictures) and the coding mode, among code amounts obtained by this preceding.

Further, the target code amount 107 used in coding correspondingly to each of plural pixel blocks (or slices) in the picture frames is determined by the second code amount allotting portion 32 by utilizing the code amount corresponding to each of the picture frames (or to each of the picture) and the coding mode, among code amounts obtained by the preceding performed in the first coding portion 41.

Then, the coding is performed according to the GOP structure determined by the GOP structure determining portion 2 so that amounts of generated codes meet the conditions concerning the target code amount 106 corresponding to each of the picture frames and the target code amount 107 corresponding to each of the plural pixel blocks (or slices).

Hereinafter, this preceding operation is described hereinbelow in more detail.

First, the preceding is performed in the first coding portion 41 according to the GOP structure determined by the GOP structure determining portion 2. The quantization characteristics used for the preceding are preset in each of coding modes.

Figures 5, 6:
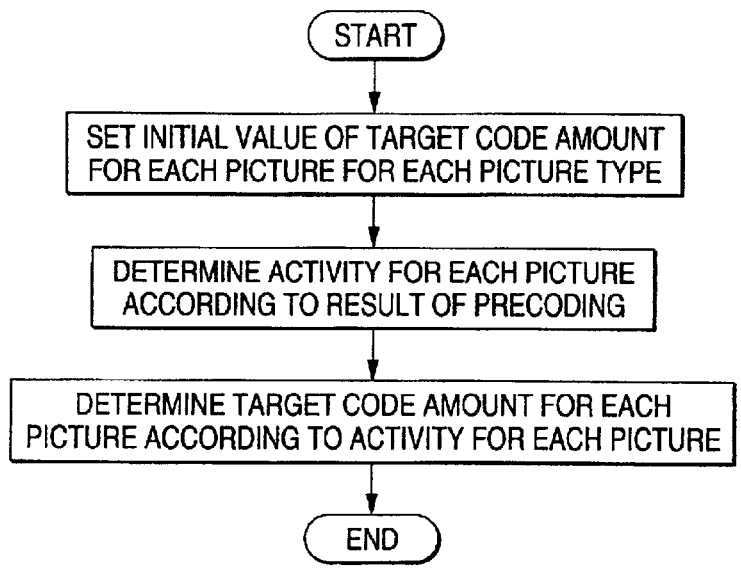
FIG. 5 is a flowchart illustrating an operation of allotting a target code amount in the embodiment of the present invention.
FIG. 6 is a diagram illustrating an example of determination of activity corresponding to each of the picture frames in the embodiment of the present invention.

Subsequently, the first code amount allotting portion 31 determines the target code amount 106 used in the coding correspondingly to each of the picture frames by utilizing the code amount corresponding to each of the picture frames (or the pictures) and the coding mode corresponding thereto, which are obtained by the preceding. A process flowchart of FIG. 5 illustrates a target code amount allotting operation to be performed in the first code amount allotting portion 31.

First, the allocation of the initial value of the target code amount corresponding to each of the picture frames (or to each of the picture types) is described hereunder. To generalize the description, let N (frames), M (frames), F (frames/s), and Bav (bit/sec) denote the number of picture frames of 1 GOP, the frame interval between the P-picture and the I- or P-picture, the frame rate of the input picture, and an average bit rate, respectively. Further, the ratio of the target code amount among the I-, P-, and B-pictures is assumed to be kR: R:1.

Incidentally, in the case that TM5, which is well known as a test model algorithm for MPEG-2 video coding system, is used and that M=3, this ratio kR:R:1≈4:2:1.

At that time, the number of I-pictures per second is F/N (frames/sec). The number of P-pictures per second is (1/M−1/N9 (frames/sec). Further, the number of B-pictures per second is F (1−1/M) (frames/sec).

Let nkR (bits), nR (bits), and n (bits) designate the target code amounts respectively corresponding to the I-picture, the P-picture, and the B-picture. Then, the following equation (3) holds:

$$Bav=nF\{R(K/N+1/M-1/N)+1-1/M\} \quad (3)$$

From the equation (3), "n" can be obtained. Consequently, the target code amounts per picture respectively corresponding to the I-, P-, and B-picture are obtained. For example, in the case that N=15, M=3, kR:R:1=4:2:1, Bav=20×10⁶ (bits/sec), and F=30 (frames/sec), "n" is obtained from the equation (3) as follows:

$$n=(5/11)\times 10^6.$$

Therefore, the initial values of the target code amounts respectively corresponding to the I-, P-, and B-pictures are 1.82 (Mbits), 0.91 (Mbits), and 0.45 (Mbits).

Subsequently, the activity corresponding to each of the picture frames (or of the pictures) is determined according to a result of the preceding (step 501).

As illustrated in FIG. 6, the determination of the activity is performed according to the initial values of the target code amounts and to the generated code amount, which corresponds to each of the pictures and is obtained by the preceding. That is, the activity is determined by being classified into, for example, 5 levels and by comparing a generated code amount corresponding to each of the picture frames, which is obtained in the first coding portion 41, with the initial value of the target code value corresponding thereto.

Incidentally, the level of the activity may be determined according to the degree of deviation between the generated code amount and the average code amount corresponding to each of the picture type, which is determined by averaging the generated code amount obtained by the preceding correspondingly to each of the picture frames, instead of the initial value of the target code amount calculated from the equation (3).

Further, although it has been described in the foregoing description that the activity is determined according to the code amounts, the activity may be determined by using the magnitudes of motion vectors.

Finally, the target code amount 106 corresponding to each of the picture frames (or each of the pictures) is determined (step 503) according to the activity corresponding thereto. Practically, the target code amount corresponding to each of the picture frames is determined by adjusting the code amount allotted thereto according to the level of the activity corresponding thereto on the basis of the initial value of the target code amount corresponding to each of the picture types. That is, to obtain uniform picture quality after the coding, an amount, which is larger than the initial value of the target code amount, is set as a target code amount in each of the picture frames, which have high activity, within a predetermined range of code amounts allotted for coding a series of picture frames. In contrast, an amount, which is smaller than the initial value of the target code amount, is set as a target code amount in each of the picture frames each having low activity.

For example, the target code amount corresponding to each of the picture frames is set by calculating the code amount per GOP from the set total code amount or from the average code amount per unit time and then distributing this code amount per GOP to each of the picture frames according to the activity thereof.

Incidentally, more uniform picture quality of the coded picture can be obtained by determining the allocation of the code amount per GOP according to the level of the activity corresponding to each of the GOPs.

Moreover, a code amount corresponding to each of the plural pixel blocks (or slices) of the picture frames is obtained by the preceding performed in the first coding portion 41. The second code allotting portion 32 determines the target code amount 107 used in coding correspondingly to each of the plural pixel blocks (or slices) of the picture frames by using the code amount corresponding to each of the plural pixel blocks (or slices) of the picture frames and also using the coding mode corresponding thereto. Practically, the target code amount 107 corresponding to each of the plural pixel blocks (or slices) is determined by performing the proportional distribution of the target code amount 106, which corresponds to each of the picture frames and is determined by the first code amount allotting portion 31, according to the ratio of code amounts among the plural pixel blocks.

Incidentally, in the case of using an object-based coding as employed in a MPEG-4 system as a picture coding method, the apparatus is adapted so that the code amount of each object is obtained during the precoding is performed in the first coding portion. The second code amount allotting portion 32 determines the target code amount 107 correspondingly to each of the objects by using the code amount and coding mode corresponding to each of the objects, similarly as in the case of determining the code amount corresponding to each of the plural pixel blocks (or slices) of the picture frame.

Next, the coding to be performed in the second coding portion 42 is described hereunder. Moreover, the coding is performed in the second coding portion 42 according to the GOP structure determined by the GOP structure determining portion 2 so that generated code amounts meet the conditions concerning the target code amounts allotted in picture frame units and plural pixel blocks (or slices) by the first code amount allotting portion 313 and the second code amount allotting portion 32.

The feedforward control method, by which the coding parameters, such as the quantization characteristics, are determined by utilizing the relation between the coding characteristic and the generated code amount is used as the coding control method for meeting the conditions concerning each of the target code amounts.

Hereinafter, the method of determining the coding parameters by utilizing the relation between the coding characteristic and the generated code amount is described. Generally, there is a tradeoff between the picture quality (or coding distortion) and the generated code amount of a coded picture. For instance, when the coding distortion is reduced by enhancing the accuracy of the quantization, the generated code amount increases. Thus, the coding parameters are determined by utilizing the relation between the coding characteristic and the generated code amount, which is obtained when the preceding is performed, or the preset relation therebetween so that the generated code amount meets the conditions concerning the target code amount.

Further, the quantization characteristics and a variable length coding (VLC) table are determined by estimating the frequency characteristics and code amount of to-be-coded picture signals from DCT coefficients on precoding. Moreover, regarding a pixel block from which an extremely large amount of codes is generated, the generated code amount in the case of using the interframe coding (or inter coding) is compared with that in the case of using the intraframe coding (or intra coding), so that an interframe/intraframe coding switching control operation is performed during the coding.

Furthermore, in preparation for the case that the target code amount is not successfully attained by the feedforward control method, the coding control operation may be performed by employing the combination of the feedforward control method and the feedback control method of controlling the coding parameters based on the buffer storage capacity.

Incidentally, although the detection of a scene change is performed on each of the picture frames of the number being equal to the default value of the size of a GOP in the aforementioned embodiment, the detection of a scene change may be performed on each of a larger or smaller number of picture frames.

Further, when the size of a GOP is determined, the size of the GOP maybe controlled according to the level of the activity corresponding to each of the picture frames or the magnitudes of the prediction error evaluation values (Ef and Eb). That is, in the case that the level of the activity is relatively high and the prediction error evaluation values (Ef and Eb) are relatively large over a plurality of frames, the size of the GOP is reduced. In contrast, in the case that the level of the activity is relatively low and the prediction error evaluation values (Ef and Eb) are relatively small over a plurality of frames, the size of the GOP is increased. The coding can be efficiently achieved by performing such a control operation.

Figure 9:
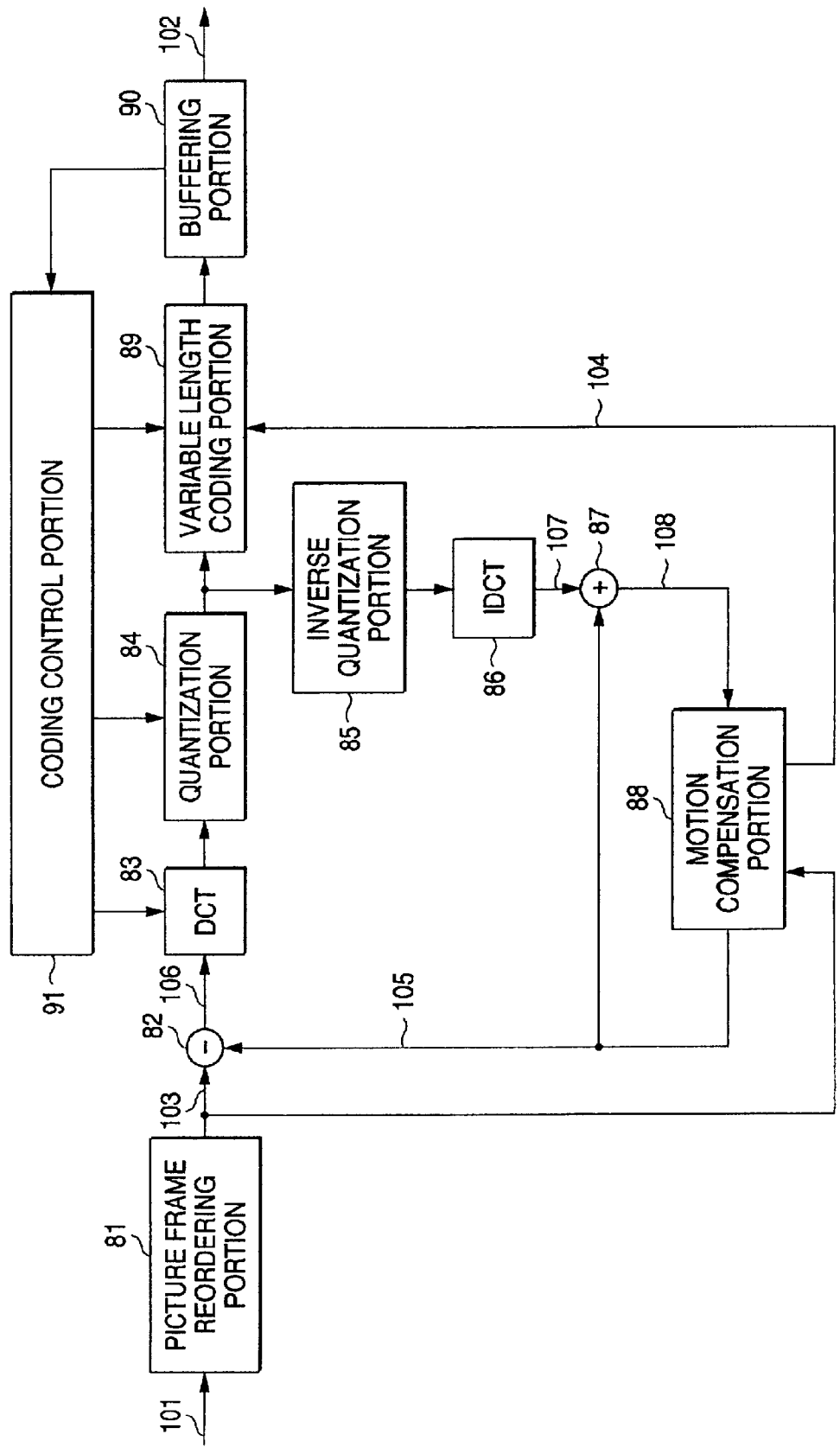
FIG. 9 is a process block diagram illustrating an operation of a conventional picture coding apparatus.

Incidentally, devices based on the GOP structures determined by the GOP structure determining portion 2 and enabled to generate a target code amount in picture frame units and plural pixel block (or slice) units allotted by the first code amount allotting portion 31 and the second code amount allotting portion 32 may be employed as the first coding portion 41 and the second coding portion 42. For example, the coding portions 41 and 42 may be constituted by devices obtained by adapting the coding control portion 91 of the conventional picture coding apparatus illustrated in FIG. 9 in such a manner as to perform the target code amount control operation. Further, other devices may be employed as such coding portions.

As described above, in the case of this embodiment, a plurality of picture frames are constituted as one group according to the correlation between picture frames in a picture sequence. Further, a coding mode corresponding to each of the picture frames of this group is determined. Moreover, precoding is performed according to the coding mode determined correspondingly to each of the picture frames. Furthermore, the coding of a picture is performed by controlling a coding parameter according to a result of precoding, and to the coding mode. Thus, the preceding is performed on a GOP suitably constituted as a group based on the interframe correlation. Consequently, highly-efficient and high quality coding corresponding to each of GOPs suitably constituted as groups can be performed, as compared with the case of performing the coding by controlling only the target code amount and the quantization characteristics.

Consequently, the variation in the coding quality in the picture frame, the long-term variation in complexity of a picture and the variation in coding quality corresponding to each of picture frames, which depends upon the presence or absence of a scene change, can be more effectively suppressed. Moreover, highly efficient coding is achieved with high quality within a restricted code amount.

Further, in the case of this embodiment, the constitution of the GOP is controlled according to the correlation between the picture frames. Thus, even in the case of coding instantaneously varying scenes and rapidly moving pictures, the feedback control operation is prevented from failing in following the actual variation in the generated code amount and from breaking down. Consequently, highly efficient coding is achieved within a restricted code amount by suppressing variation in the coding quality.

When the present invention is utilized for digital broadcasting service, the necessary transmission capacity including capacity for picture information can be reduced. Further, when the present invention is used for storing pictures in, for example, a DVD, the necessary storage capacity thereof can be reduced by effective coding.

Second Embodiment

Figure 7:
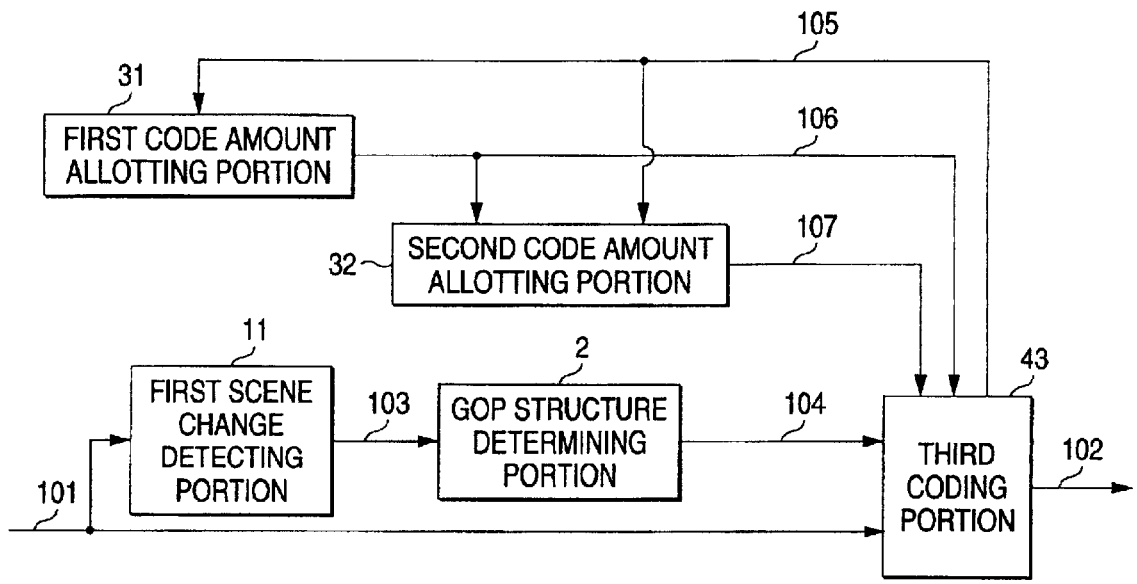
FIG. 7 is a block diagram illustrating the configuration of another picture coding apparatus according to the present invention.

FIG. 7 is a block diagram illustrating the configuration of another picture coding apparatus according to the present invention. In FIG. 7, reference numeral 43 designates a third coding portion. The rest of the constituent elements of the apparatus are the same as the corresponding elements illustrated in FIG. 1. The third coding portion 43 is a common coding device serving as both the encoder used for preceding and the encoder used for coding. Incidentally, the third coding portion 43 uses a coding parameter used for preceding, which differs from a coding parameter used for coding. That is, parameters respectively corresponding to the coding modes are preliminarily set. Thus, when performing the preceding, the portion 43 uses the preset parameter for preceding.

With such a configuration, the scale of the apparatus can be decreased. This embodiment is effective especially in the case that real-time processing is unnecessary.

Figure 8:
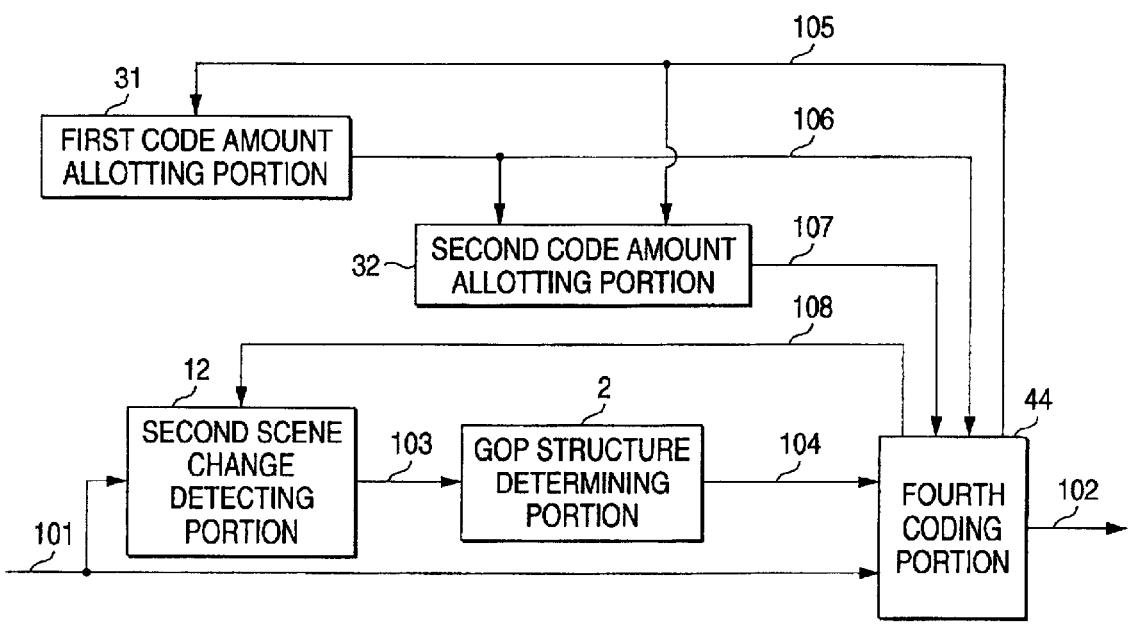
FIG. 8 is a block diagram illustrating the configuration of another picture coding apparatus according to the present invention.

FIG. 8 is a block diagram illustrating the configuration of still another picture coding apparatus according to the present invention. In FIG. 8, reference numeral 12 designates a second scene change detecting portion, and 44 denotes a fourth coding portion. The rest of the apparatus is similar to the corresponding part of the apparatus of FIG. 8. The fourth coding portion 44 is a common coding device serving as both the encoder used for preceding and the encoder used for coding. Moreover, the fourth coding portion 44 is adapted to perform the motion compensation interframe prediction operation for obtaining the prediction error evaluation values Ef and Eb on detecting a scene change.

With such a configuration, the scale of the apparatus can be decreased. Also, this embodiment is effective especially in the case that real-time processing is unnecessary.

Incidentally, devices based on the GOP structures determined by the GOP structure determining portion 2 and enabled to generate a target code amount in picture frame units and plural pixel block (or slice) units allotted by the first code amount allotting portion 31 and the second code amount allotting portion 32 may be employed as the third coding portion 43 and the fourth coding portion 44. For example, the coding portions 43 and 44 may be constituted by devices obtained by adapting the coding control portion 91 of the conventional picture coding apparatus illustrated in FIG. 9 in such a manner as to perform the target code amount control operation. Further, other devices may be employed as such coding portions.

Incidentally, according to the present invention, the concept of "frame" includes a "field" of a video image represented by what is called a television signal. That is, the present invention provides an apparatus having constituent elements for detecting the correlation between fields represented by a television signal and for grouping the fields into groups. Further, such an apparatus has effects similar to those of the aforementioned embodiments of the present invention.

Further, the present invention may be practiced by using software and firmware, which are caused by a processor to function, instead of being implemented by using the apparatuses described in the foregoing description of the embodiments. A program for performing the method of the present invention may be generated and recorded on a recording medium. The program itself, or the function of this method can be provided through communication media, such as the Internet.

As described above, according to the present invention, there is provided a picture coding apparatus that comprises group structure determining means for constituting a plurality of picture frames as one group according to the correlation between picture frames in a picture sequence and for determining a coding mode corresponding to each of the picture frames of this group, preceding means for performing preceding according to the coding mode determined by this group structure determining means correspondingly to each of the picture frames, and coding means for performing coding of a picture by controlling a coding parameter according to a result of preceding, which is obtained by this preceding means, and to the coding mode determined by the group structure determining means. Thus, a target code amount in the case of performing coding is determined according to a code amount, which is obtained by performing preceding on a GOP suitably constituted as a group based on the interframe correlation, and the exsistence of a scene change, and a coding control operation can be performed. Consequently, highly-efficient and high quality coding corresponding to each of GOPs suitably constituted as groups can be performed within a restricted code amount.

Further, desired picture quality is realized in each of regions of a picture frame by setting a target code amount correspondingly to each of the regions therein and by performing coding so that a generated code amount is equal to the target code amount. Moreover, the coding of each of the regions in the picture frame is achieved with uniform quality.

What is claimed is:

1. A picture coding apparatus comprising:
   a group structure determining portion for constituting a plurality of picture frames as a group according to correlation between the picture frames in a picture sequence, the group structure determining portion for determining a coding mode corresponding to each of the picture frames of the group;
   a precoding portion for performing precoding according to the coding mode determined by the group structure determining portion correspondingly to each of the picture frames;
   a coding portion for performing coding of a picture by controlling a coding parameter according to a result of the precoding obtained by the precoding portion and to the coding mode determined by the group structure determining portion; and
   a scene change detecting portion for evaluating correlation between the picture frames in the picture sequence and for detecting, when there is a part having low interframe correlation, the part as a scene change part, wherein the group structure determining portion sets the plurality of picture frames as the group according to the detected scene change part;
   wherein the scene change detecting portion performs a forward motion compensation interframe prediction and a backward motion compensation interframe prediction on each frame of an input picture sequence having a plurality of frames to detect a scene change by evaluating results of both the forward and backward predictions.

2. The picture coding apparatus according to claim 1, wherein the scene change detecting portion detects scene change by calculating a prediction error evaluation value for each of the regions of the frames and evaluating the calculated prediction error evaluation value for each of the frames.

3. A picture coding apparatus comprising:
   a group structure determining portion for constituting a plurality of picture frames as a group according to correlation between the picture frames in a picture sequence, the group structure determining portion for determining a coding mode corresponding to each of the picture frames of the group;
   a precoding portion for performing precoding according to the coding mode determined by the group structure determining portion correspondingly to each of the picture frames; and
   a coding portion for performing coding of a picture by controlling a coding parameter according to a result of the precoding obtained by the precoding portion and to the coding mode determined by the group structure determining portion;
   wherein the group structure determining portion sets a default value of the number of frames when the group is constituted;
   when a part having low interframe correlation exists, the group structure determining portion sets the number of frames of the group so that a boundary of the group is located in the part having low interframe correlation; and
   when the number of consecutive picture frames each having high interframe correlation exceeds the default value, the group structure determining portion sets the number of frames of the group at a value larger than the default value.

4. A picture coding apparatus comprising:
   a group structure determining portion for constituting a plurality of picture frames as a group according to correlation between the picture frames in a picture sequence, the group structure determining portion for determining a coding mode corresponding to each of the picture frames of the group;
   a precoding portion for performing precoding according to the coding mode determined by the group structure determining portion correspondingly to each of the picture frames; and
   a coding portion for performing coding of a picture by controlling a coding parameter according to a result of the precoding obtained by the precoding portion and to the coding mode determined by the group structure determining portion;
   wherein, when determining the coding mode of each of the picture frames of the group, the group structure determining portion sets a frame interval between a unidirectional prediction coded frame and an interframe coded frame or a default value of the frame interval therebetween and allots a unidirectional motion compensation interframe prediction coding mode to a corresponding picture frame, and also allots a unidirectional interframe prediction coding mode preferentially to a picture frame whose unidirectional motion compensation interframe prediction error evaluation value is less than a predetermined value.

* * * * *